United States Patent
Petrocelli et al.

(10) Patent No.: US 8,156,126 B2
(45) Date of Patent: Apr. 10, 2012

(54) METHOD FOR THE ALLOCATION OF DATA ON PHYSICAL MEDIA BY A FILE SYSTEM THAT ELIMINATES DUPLICATE DATA

(75) Inventors: Robert R. Petrocelli, Westerly, RI (US); Jill Duff, East Greenwich, RI (US)

(73) Assignee: GreenBytes, Inc., Ashaway, RI (US)

( * ) Notice: Subject to any disclaimer, the term of this patent is extended or adjusted under 35 U.S.C. 154(b) by 466 days.

(21) Appl. No.: 12/501,802

(22) Filed: Jul. 13, 2009

(65) Prior Publication Data
US 2010/0010996 A1    Jan. 14, 2010

Related U.S. Application Data

(60) Provisional application No. 61/080,350, filed on Jul. 14, 2008.

(51) Int. Cl.
 *G06F 17/20* (2006.01)
 *G06F 15/16* (2006.01)
(52) U.S. Cl. .................................. 707/747; 707/687
(58) Field of Classification Search ................ 707/687, 707/747
See application file for complete search history.

(56) References Cited

U.S. PATENT DOCUMENTS

| | | | | |
|---|---|---|---|---|
| 5,202,982 A * | 4/1993 | Gramlich et al. | ................ | 1/1 |
| 5,241,638 A * | 8/1993 | Mork et al. | ................ | 711/207 |
| 5,475,826 A * | 12/1995 | Fischer | ................ | 707/695 |
| 5,608,801 A * | 3/1997 | Aiello et al. | ................ | 380/46 |
| 5,694,569 A * | 12/1997 | Fischer | ................ | 711/216 |
| 5,973,692 A * | 10/1999 | Knowlton et al. | ................ | 715/835 |
| 2008/0320271 A1 * | 12/2008 | Cooke | ................ | 711/219 |

* cited by examiner

*Primary Examiner* — John E Breene
*Assistant Examiner* — Alex Gofman
(74) *Attorney, Agent, or Firm* — Barlow, Josephs & Holmes, Ltd.

(57) ABSTRACT

The present invention is a method for the allocation of data on physical media by a file system that eliminates duplicate data. Efficient searches are employed using a unique algorithm when a compare on hash is used to achieve realtime operation of the file system. The in memory feature of the invention allows the search to be performed in constant time. Also, the on disk representation of search structures enables the present invention to maintain these critical search structures in a highly efficient, self-consistent and resilient manner.

4 Claims, 2 Drawing Sheets

METHOD FOR THE ALLOCATION OF DATA ON PHYSICAL MEDIA BY A FILE SYSTEM THAT ELIMINATES DUPLICATE DATA

CROSS REFERENCE TO RELATED APPLICATION

This application is related to and claims priority from earlier filed provisional patent application Ser. No. 61/080,350 filed Jul. 14, 2008, the entire contents thereof is incorporated herein by reference.

BACKGROUND OF THE INVENTION

The present invention relates generally to a method for the allocation of data on physical media by a file system that eliminates duplicate data. The present invention relates to such a method that is implemented in computer software code running on computer hardware.

The operation of computers are very well known in the art. Such a file system exists on a computer or across multiple computers, where each computer typically includes data storage, such as a hard disk or disk(s), random access memory (RAM) and an operating system for executing software code. Software code is typically executed to carry out the purpose of the computer. As part of the execution of the computer code, storage space on the hard disk or disks and RAM are commonly used. Also, data can be stored, either permanently or temporarily on the hard disk or disks and in RAM. The structure and operation of computers are so well known in the art that they need not be discussed in further detail herein.

In the field of computers and computing, file systems are also very well known in the art to enable the storage of such data as part of the use of the computer. A computer file system is a method for storing and organizing computer files and the data they contain to make it easy to find and access them. File systems may use data storage devices such as a hard disks or CD-ROMs and involve maintaining the physical location of the files, and they might provide access to data by the computer operating system or on a file server by acting as clients for a network protocol (e.g., NFS, SMB, or 9P clients). Also, they may be virtual and exist only as an access method for virtual data.

More formally, a file system is a special-purpose database for the storage, organization, manipulation, and retrieval of data. This database or table which centralizes the information about which areas belong to files, are free or possibly unusable, and where each file is stored on the disk. To limit the size of the table, disk space is allocated to files in contiguous groups of hardware sectors called clusters. As disk drives have evolved, the maximum number of clusters has dramatically increased, and so the number of bits used to identify each cluster has grown. For example, FAT, and the successive major versions thereof are named after the number of table element bits: 12, 16, and 32. The FAT standard has also been expanded in other ways while preserving backward compatibility with existing software.

File systems are specialized databases which manage information on digital storage media such as magnetic hard drives. Data is organized using an abstraction called a file which consists of related data and information about that data (here after referred to as metadata). Metadata commonly consists of information like date of creation, file type, owner, and the like.

The file system provides a name space (or a system) for the unique naming of files. File systems also frequently provide a directory or folder abstraction so that files can be organized in a hierarchical fashion. The abstraction notion of file and folders does not represent the actual physical organization of data on the hard disk only its logical relationships.

Hard disks consist of a contiguous linear array of units of storage referred to as blocks. Blocks are all typically the same size and each has a unique address used by the disk controller to access the contents of the block for reading or writing. File systems translate their logical organization into the physical layer by designating certain address as special or reserved. These blocks, often referred to as super-blocks, contain important information about the file system such as file system version, amount of free space, etc. They also contain or point to other blocks that contain structures which describe directory and file objects.

One of the most important activities performed by the file system is the allocation of these physical blocks to file and directory objects. Typically each file consists of one or more data blocks. If files are stored on the file-system which contains identical data blocks, no provision is made to identify that these blocks are duplicates and avoid the allocation of (wasted) space for these duplicate blocks. The present invention relates to a method, using an algorithm implemented in software processing steps in a computer, for determining if a new block of data is a duplicate.

In the prior art, there is a well known method that is used to determine if two data blocks are identical without the exhaustive comparison of each bit in the data block. This is commonly referred to as "compare on hash". A hash is a mathematical function that produces a fixed length bit sequence that uniquely identifies any variable length input data. Hash functions are commonly used in cryptography to generate digital signatures that change if a data buffer differs by even one bit from the original buffer used to generate the hash. The size of the hash code, in bits, is called the digest size. The larger the digest size, the more resistant the hash algorithm is to random collision, which is the creation of matching hashes from data blocks which do not match.

The present invention relates to a method that requires a cryptographic quality hash with a digest size of at least 192 bits. There is a need to compute the hash for each data block written to the file system so that hash values can be compared to determine if data blocks, such as ones that are very large in size, are equivalent.

The prior art suffers from the disadvantage that it mush compare the full hash code to determine whether a new data block is a duplicate block or not. As can be understood, this is particularly problematic with large digest sizes, such as those that are 192 bits in length.

To address these problems associated with file systems of non-trivial (i.e. very large) size, highly optimal search structures are needed. As can be understood, inefficient search structures will cause significant degradation of file system performance as more blocks, and hence more searches, are managed by the system. The prior art fails to provide such an optimized search structure and method. Therefore, there is a need for a more efficient search algorithm and better way for the hash data to be stored to enable more efficient searching to, in turn, realize faster and more efficient determination of whether a new data block is duplicate data.

In view of the foregoing, there is a need to provide a method for the allocation of data on physical media by a file system that eliminates duplicate data.

There is a need for a more efficient and optimized search structure.

There is a need for a more efficient search algorithm to reduce I/O load on a system.

There is also a need for method of determining whether a new data block is a duplicate that can better handle large hash files.

There is a further need to provide a method that can better store hash values for more efficient searching.

Yet another need is to provide a method that can reduce the number of search operations when determining whether a new data block is a duplicate.

There is also a need to reduce the time for determining whether a new data block is a duplicate.

SUMMARY OF THE INVENTION

The present invention preserves the advantages of prior art methods, devices and systems of allocating of data on physical media by a file system that eliminates duplicate data. In addition, it provides new advantages not found in currently available methods, devices and systems therefor and overcomes many disadvantages of such currently available methods, devices and systems.

The method includes allocating data on physical media by a file system that eliminates duplicate data. First, user data is provided on a storage device. The user data is inputting the user data into a hash algorithm to create a hash value output having a hash bit length. The hash value output is distributed across an entire range of an output digest. A static array of elements that has a length of $2^N$ with N<D, where N is the first partial bits of a hash value output and D is the number of bits in the hash value output is created. A dynamic search node array having at least one search node therein is created. Elements in the static array point to corresponding search nodes. In the search nodes, an integer index I and a primary cache hint of a length $2^H$ is created where the size of a search node element equals (I)+H with H being the next portion of bits to be compared. The integer index contains an address in persistent storage of a computer. A full hash value and reference count is stored in the address. The first N bits of a hash value output in the static array are search for a match therewith. If no matches are found, a new search node in the dynamic search array is inserted and referenced by its respective address. If a match is found, each search node in the dynamic array is inspected for a matches with a secondary cache hint consisting of the next H bits of the hash value. If there is a match with the secondary cache hint, a match with the entire hash value is searched.

The hash value output is preferably stored on a device separate from where the user data is stored. The hash value data stored on the dedicated cache device includes a header with version information with continuous blocks containing a plurality of search nodes, each containing a full hash value and reference count. It is preferred that an entire block of search nodes are written in a single atomic I/O process to perform an update to the dedicated cache.

It is therefore an object of the present invention to provide a method for the allocation of data on physical media by a file system that eliminates duplicate data.

Another object of the invention is to provide a more efficient and optimized search structure.

A further object of the present invention is to provide a more efficient search algorithm to reduce I/O load on a system.

Another object of the present invention is to provide a method of can better handle large hash files when determining whether a new data block is a duplicate.

Yet another object of the present invention is to provide a method that can better store hash values for more efficient searching.

Still further, another object of the present invention is to provide a method that can reduce the number of search operations when determining whether a new data block is a duplicate.

Another object of the present invention is to reduce the time for determining whether a new data block is a duplicate.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

As seen in the attached drawing figures, details of the preferred embodiment of the method of the present invention are shown. The present invention provides a method for the allocation of data on physical media by a file system that eliminates duplicate data. In general, the present invention provides a more efficient and faster search method for determining whether a new data block is duplicate data. The method employs the hash code created from an input data block to make this comparison.

As is well known in the art, a hash is a mathematical function that produces a fixed length bit sequence that uniquely identifies any variable length input data. Hash functions are commonly used in cryptography to generate digital signatures that change if a data buffer differs by even one bit from the original buffer used to generate the hash. The size of the hash code, in bits, is called the digest size. The larger the digest size, the more resistant the hash algorithm is to random collision, which is the creation of matching hashes from data blocks which do not match.

To carry out the present invention, a cryptographic quality hash with a digest size of at least 192 bits is preferred. By computing the hash for each data block written to the file system, hash values can be compared and it can be determined if (much larger) data blocks are equivalent. To achieve this with a file system that is non-trivial (i.e. very large) in size requires highly optimal search structures. Inefficient search structures will cause significant degradation of file system performance as more blocks, and hence more searches, are managed by the system. The present invention provides a search method and algorithm and a method and system how the hash data is stored for efficient searching thereof.

A first important element of the present invention is a succinct searching approach that minimizes the number of operations needed to determine if a hash value has already been computed and stored in a file-system. Common search techniques make use of binary search trees. These approaches requires log(N) operations to complete a search (where N is the number of elements being searched). The new approach of the present invention exploits properties of any cryptographic hash algorithm to complete a search operation in constant time, generally in <3 comparisons. This is much less than traditional logarithmically bounded algorithms.

Figure 1:
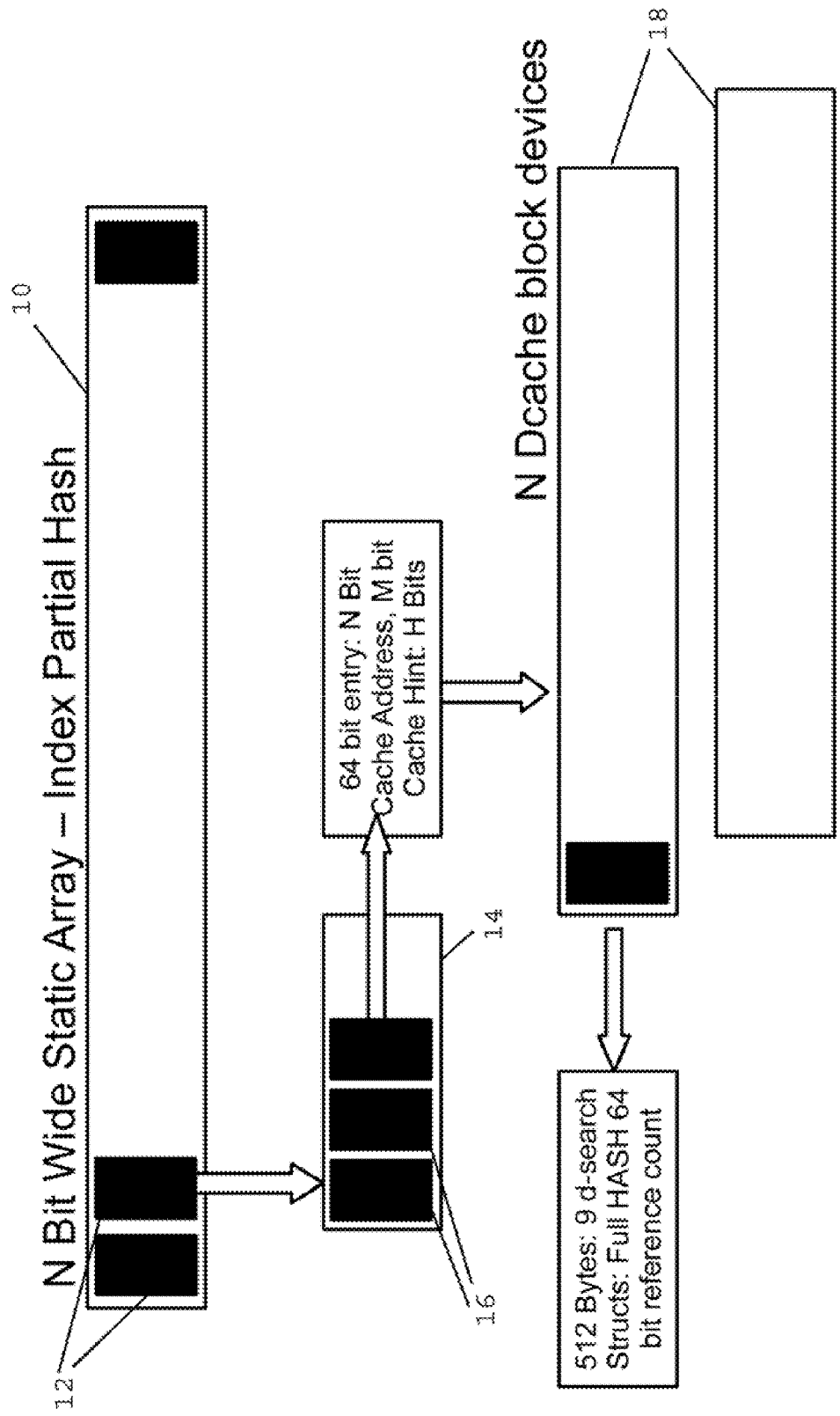
FIG. 1 is a chart illustrating the steps of the search method and use of a separate cache device of the present invention.

The search method and algorithm of the present invention executes in RAM memory of a computer. The in-memory representation makes use of a property of hash algorithms that causes their outputs to be informally distributed across the entire address range of the output digest. Specifically, the probability given a random input block of any one 256 bit hash value is $1/2^{256}$. In the present method, a seen in FIG. 1 a static array B, referenced as 10, of length $2^N$ where N<D (where D=number of bits in the hash digest) is created. Each element 12 in B is a pointer to a dynamic array 14 of search nodes 16. Each search node 16 contains an integer index I and a cache hint of length $2^H$, where size of (I)+H=size of (search node element). The index I contains an address in the persistent storage of the computer. This address holds a structure that contains the full hash value and a reference count.

To perform a search, the algorithm looks up the first N bits of the incoming hash value in the static array 10. The likelihood of a match at this level of search is exactly $1/(2^{(N/2)})$. If no match is found a new node 16 is inserted into the dynamic array 14 referenced by this address in the static array 10 in corresponding element 12. If a match is found at this level then each element 16 in the dynamic array 14 must be inspected for a match. Rather than simply comparing the full hash value at this point, a secondary cache hint is compared. This avoids expensive I/O (i.e. input/output computer cycles) to a persistent storage device. The cache hint consists of the next H bits in the hash values being compared. Matches at this level will now necessitate disk I/O to compare the full hash. The cache hint is critical to the performance of the algorithm of the present invention.

The following example illustrates the usefulness of the present invention and the advantages it has over prior art methods. In this example, reference is made to a 90 TB storage system that uses a block size of 32 KB and is full of unique blocks. This generates a worst case scenario because a 24 bit static array 10 will populate each of its dynamic arrays 14 containing 20 elements 16. Without the cache hint compare in the present invention, at most 20 disk I/Os would be required to compare each hash value on the disk, which is comparable to a log(N) search tree. When a hint of only 10 bits in length, provided by the present invention, the average number of disk I/Os would be reduced to $(20*1/(2^{(H/2)}))=1$ I/O/search. Therefore the lower-bound on the search method of the present invention is 2 comparisons, the average is 3 and the worst case upper bound is log(N). It should be understood that as a storage system becomes large, the probabilistic search approach of the present invention remains 10 to 20 times faster than tree-based searches found in the prior art.

The location and nature of the system for storing hash values can be further optimized, in accordance with the present invention, to further optimize performance. By way of background, the search algorithm stores hash values in the persistent portion of computer memory (e.g. hard disk). These hash values, to be searched, must be stored permanently so that search can resume after a power failure or system restart. In the approach of the present invention, hash values are preferably stored in two locations: 1) Close to the actual data in the storage pool and 2) on a cache device(s) dedicated to fast hash searches. The hash value retained in the storage pool is used only as a reference to rebuild the cache device in the event of a catastrophic hardware failure.

Figure 2:
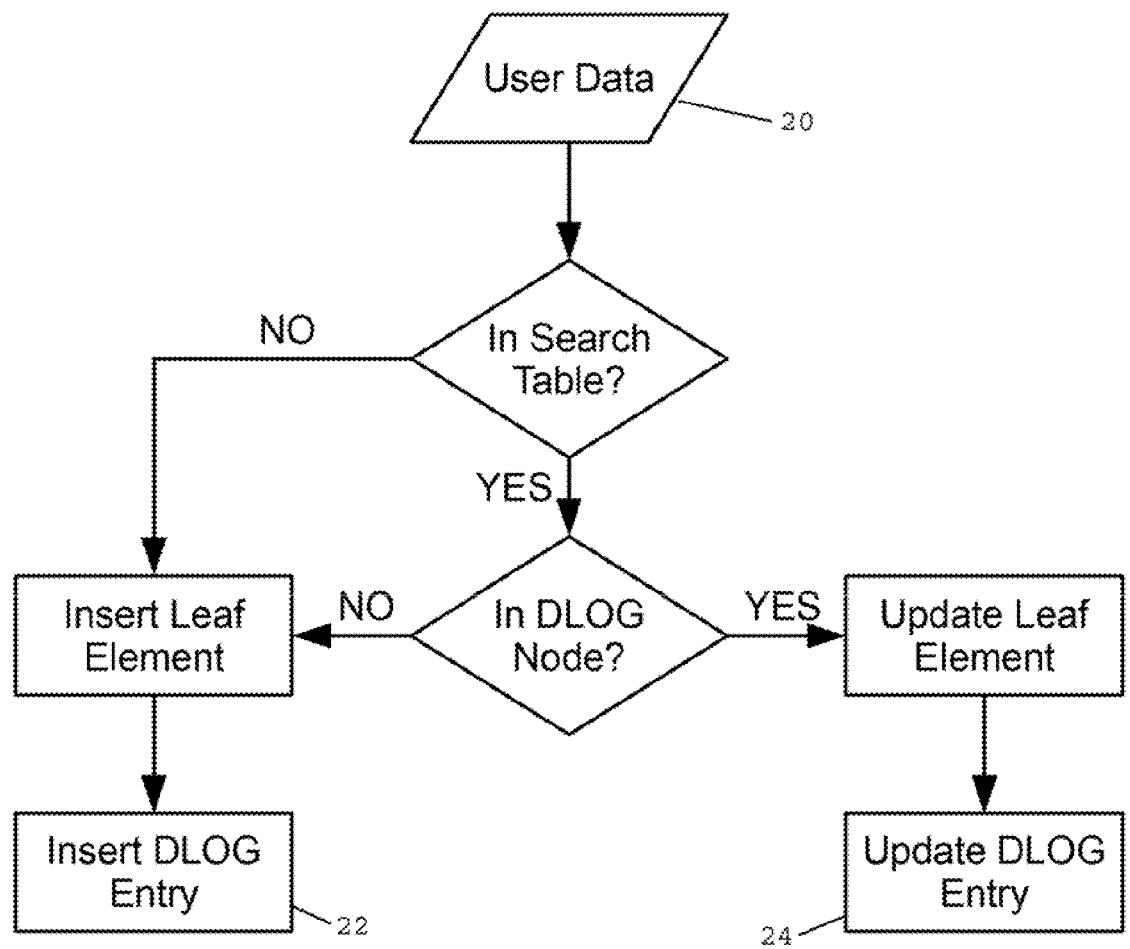
FIG. 2 is a flow chart illustrating search logical flow of the present invention to eliminate duplicate data.

Using the search method as described above and shown in FIG. 1, to traverse the main storage pool, there would be competition with the file-system's use of this pool for primary data storage and performance would be significantly degraded as a result. A separate cache device is preferred to insure consistent high performance searches. The present invention also provided management of the cache device. The logical flow of this is shown in FIG. 2. Each time a new data 20 is stored its hash value is stored on the cache device, such as 18 in FIG. 1. The new hash value will either create a new entry on the cache device at 22, or in the case of duplicate data, a duplicate hash will increment an existing hash entries reference count for an update at 24. This update or insert must take place atomically. In other words it cannot be interrupted and will return either success or failure. This is commonly called a transaction.

In the present invention, the cache device(s) 18, called the Dcache (de-duplication cache), is a block addressable device, as seen in FIG. 2. The organization of data on the device is as follows: a header with version information with continuous blocks B (12 in array 10) each containing N search nodes (16 in array 14). The search nodes 14 each contain the full hash and reference count. When inserting new hash values a new block containing the previous search nodes and the new hash value will always append the Dcache. The last block will be continually overwritten until N search nodes have been inserted. Once a block is full, a new block will be allocated from the end of this list. Updates occur in place with the entire block of search nodes being written in a single atomic I/O. The foregoing, allows the Dcache of the present invention to be free of meta-data, self-describing and always in an internally consistent state.

Deletion of a search node is achieved using 2 write operations. The first operation overwrites the block containing the search node 16 to be deleted with the same block except for the deleted search node. This node is replaced using the last search node on the Dcache. The second write updates the last block on the Dcache to reflect the removal of the last search node which was used to "plug the hole" in the deleted search node's block. In this way the Dcache is always continuous and is self defragmenting. The delete is still atomic because the second write is optional in the sense that if a system crash interrupts the second write it will be corrected when the Dcache is scanned to build the static search table on system restart.

It should be understood that the present invention may be employed in any type of operating system. The present invention may be implemented in any type of software code using any language and can run on any type of computer hardware. This unique method may also be employed for data stored in any type of storage device, such as arrays of storage devices and any type of device, such as magnetic, solid state (such as flash) and optical media.

In view of the foregoing, a new and unique method for the allocation of data on physical media by a file system that eliminates duplicate data. Efficient searches are employed using a unique algorithm when a compare on hash is used to achieve realtime operation of the file system. Comparisons of portions of the hash value, in the form of a cache hint, substantially improves efficiency of the search for duplicate data. Moreover, the in memory aspect of the invention allows the search to be performed in constant time. Also, the on disk representation of search structures enables the present invention to maintain these critical search structures in a highly efficient, self-consistent and resilient manner.

It would be appreciated by those skilled in the art that various changes and modifications can be made to the illustrated embodiments without departing from the spirit of the present invention. All such modifications and changes are intended to be covered by the appended claims.

What is claimed is:

1. A method of allocating data on physical media by a file system that eliminates duplicate data, comprising the steps of:

providing user data stored on a storage device;
inputting the user data into a hash algorithm to create a hash value output having a hash bit length;
distributing the hash value output across an entire range of an output digest;
creating a static array of elements that has a length of $2^N$ with N<D, where N is the first partial bits of a hash value output and D is the number of bits in the hash value output;
creating a dynamic search node array having at least one search node therein;
pointing each element in the static array to a corresponding at least one search node;
creating an integer index I and a primary cache hint of a length $2^H$ in the at least one search node where the size of a search node element equals (I)+H with H being the next portion of bits to be compared; the integer index containing an address in persistent storage of a computer; storing a full hash value and reference count in the address;
searching the first N bits of a hash value output in the static array for a match therewith; if no matches are found, inserting a new search node in the dynamic search array and referenced by its respective address; if a match is found, inspecting each search node in the dynamic array for a matches with a secondary cache hint consisting of the next H bits of the hash value;
searching for match with the entire hash value if there is a match with the secondary cache hint.

2. The method of claim 1, further comprising the step of:
storing the hash value output on a device separate from where the user data is stored.

3. The method of claim 2, wherein the hash value data stored on the dedicated cache device includes a header with version information with continuous blocks containing a plurality of search nodes, each containing a full hash value and reference count.

4. The method of claim 3, further comprising the steps of:
writing an entire block of search nodes in a single atomic I/O process to perform an update to the dedicated cache.

* * * * *